Oct. 25, 1949.   M. G. TOWNSLEY   2,486,225
OPTICAL SYSTEM FOR PROJECTING A PLURALITY
OF IMAGES OF ONE RETICLE OR IMAGE SOURCE
BY MEANS OF A PLURALITY OF REFLECTORS
Filed June 29, 1946

INVENTOR
MALCOLM G. TOWNSLEY
BY Robert F. Miehle jr.
ATTY.

Patented Oct. 25, 1949

2,486,225

UNITED STATES PATENT OFFICE 2,486,225

OPTICAL SYSTEM FOR PROJECTING A PLURALITY OF IMAGES OF ONE RETICLE OR IMAGE SOURCE BY MEANS OF A PLURALITY OF REFLECTORS

Malcolm G. Townsley, Park Ridge, Ill., assignor to Bell & Howell Company, Chicago, Ill., a corporation of Illinois Application June 29, 1946, Serial No. 680,355

6 Claims. (Cl. 88—1)

1

Objects of my invention reside in the provision of a novel and effective optical imaging system which is operative to form two images of one image source, such as a reticle, say for the superimposing of such images upon a scene or object being viewed for the purpose of sighting, which provides for the relative adjustment of the images to vary the lateral displacement of the same, which renders both images sufficiently distinct, which imparts different colors respectively to the images to differentiate the same, and which permits the system to be desirably compact.

The invention will be better understood by reference to the accompanying drawing forming a part hereof and in which—

Figure 1:
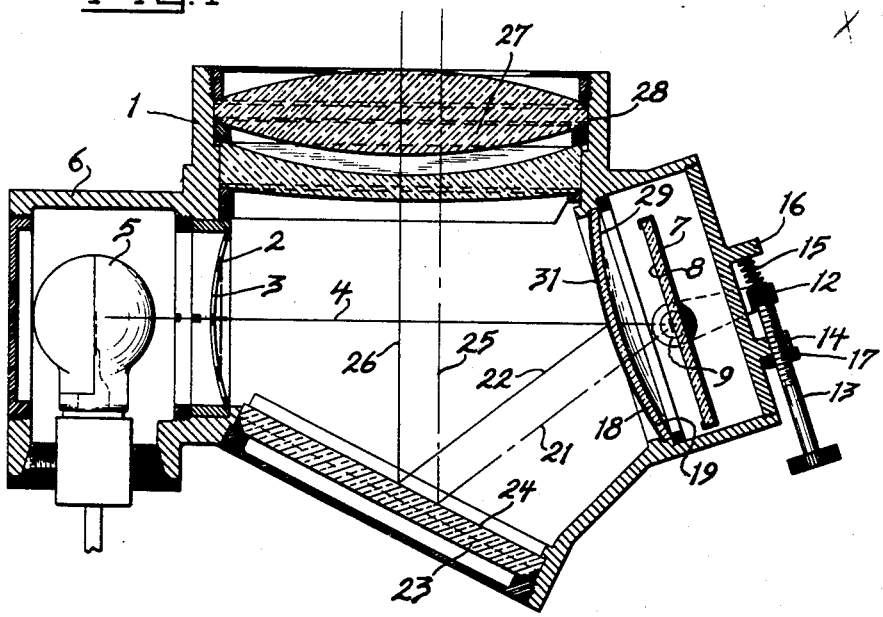
Figure 2:
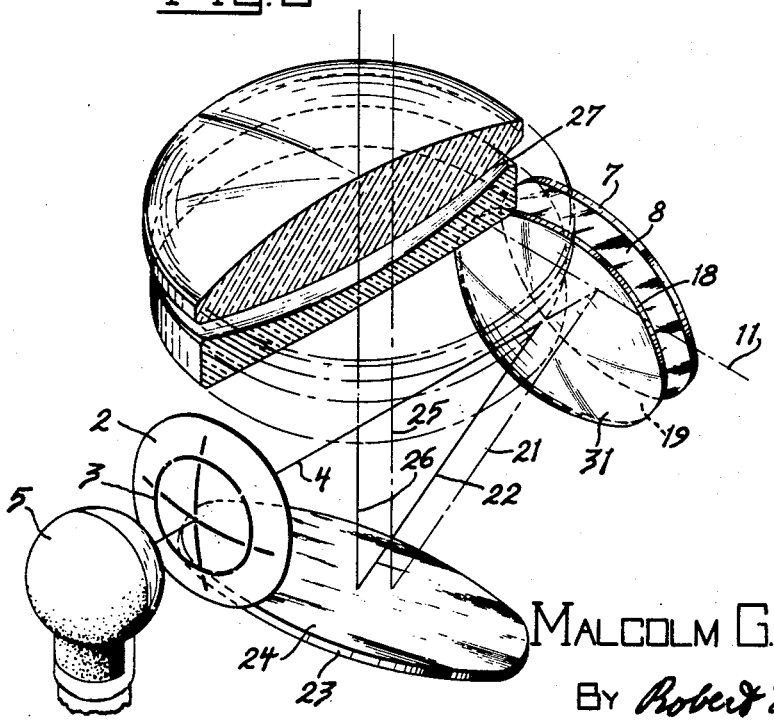

Figure 1 is a sectional view of an optical imaging system embodying my invention and taken on the axial plane thereof; and Figure 2 is a perspective view of the optical elements of the system with a portion of the objective lens of the system broken away.

Referring to the drawing, a casing is generally designated at 1, and a reticle 2 is secured within the casing, the reticle being of opaque material which is perforated to provide a reticle design 3. The reticle is disposed on an axis 4 extending across the enclosure of the casing, and an incandescent electric lamp 5 is mounted within an extension 6 of the casing in back of the reticle and serves to illuminate the reticle design 3, light from the illuminated reticle design passing along the axis 4.

A totally reflecting plano reflector 7 is disposed within the casing 1 and is inclined across the axis 4 in spaced relation with the reticle 2 and is operative, by means of its reflecting surface 8 being directed toward the reticle, to reflect light received along this axis from the reticle. This reflector is pivotally mounted on the casing 1 in a usual manner, generally designated at 9 in Figure 1, on an axis designated at 11 in Figure 2. The reflector 7 is pivotally adjusted on the axis 11 for a purpose hereinafter appearing, by means, see Figure 1, of an arm 12 secured with this reflector, an adjusting screw 13 screwthreaded through a lug 14 on the exterior of the casing and engaging the arm, and a spring 15 reacting on a lug 16 on the exterior of the casing and operative on the arm 12 in opposition to the screw 13, so that rotation of the screw effects pivotal adjustment of the reflector, a lock nut 17 being screwthreaded on this screw and engageable against the lug 14 to releasably secure the reflector in adjusted position.

A partial reflector 18 is secured within the casing 1 and is inclined across the axis 4 between and in spaced relation with the reticle 2 and the reflector 7 and, being interposed between the reticle 2 and reflector 7 and having its partial reflecting surface 19 directed toward the reticle, is operative to reflect a portion of the light received along the axis 4 from the reticle and to transmit the remaining portion of this light to the reflector 7 for reflection therefrom.

The reflectors 7 and 18 extend and are similarly inclined across the axis 4, so that the portions of the light, received along the axis 4 from the reticle 2 and respectively reflected by these reflectors, are reflected thereby in the same direction away from the axis 4 and respectively along axes 21 and 22 laterally displaced from each other and similarly inclined to the axis 4.

Another totally reflecting plano reflector 23 is secured within the casing 1 and is laterally spaced from the portion of the axis 4 between the reticle 2 and reflector 18 in the direction in which the said light portions are reflected away from this axis by the reflectors 7 and 18 along the axes 21 and 22, and the reflector 23 is inclined to the axis 4 similarly to but to a lesser extent than the inclination of the reflectors 7 and 18 to the axis 4 and is operative, by reason of its reflecting surface 24 being directed toward the reflectors 7 and 18, to reflect the light portions received along the axes 21 and 22 from the reflectors 7 and 18, across the axis 4 and along similarly extending axes respectively designated at 25 and 26.

An objective lens 27 is mounted within and extends across an opening 28 in the casing 1, and as so mounted is laterally spaced from the axis 4 in the direction opposite the direction in which the said light portions are reflected away from this axis along the axes 21 and 22 by the reflectors 7 and 18, and the lens 27 is disposed across the axes 25 and 26 and is thus operative to project the light portions as reflected by the reflector 23 to form two images of the reticle 2. It is to be noted that the device is rendered quite compact by reason of the reflector 23 and the arrangement of this reflector and the lens 27 in oppositely laterally spaced relation with the axis 4. The partial reflector 18 is in the form of a transparent sphero concavo convex member of which the convex surface thereof forms the partial reflecting surface 19 thereof and is directed toward the reticle 2 and of which the concave surface 29 thereof has its curvature axis substantially coincident with that of the convex surface 19, thus giving the reflector 18 a substantially no power meniscus form, though it is possible that this reflector may have a minor amount of power.

The convex spherical reflecting surface 19 of the reflector 18 accommodates for the different light path distances between the reticle 2 and the objective lens 27 incident to reflection of the light portions respectively by the reflectors 7 and 18, so that the two images formed by the lens 27 are of substantially equal sharpness at a given plane. It follows that if one of the two images is projected at infinity, the other image is also projected substantially at infinity.

The reflector 18 being fixed, the image incident to reflection therefrom is fixed. As before described, the reflector 7 is pivotally adjustable on the axis 11 of the pivotal mounting 9 by rotation of the screw 13, and this adjustment of the reflector 7 serves to vary the inclination of this reflector to the axis 4 with the result that the image incident to reflection by this reflector is laterally adjustable relative to the image incident to reflection by the reflector 18, so that the lateral displacement of these images may be varied. As shown, the axis 11, see Figure 2, intersects the axis 4 and is disposed at the reflecting surface 8 of the reflector 7 and normal to the plane of inclination of the reflecting members 7 and 18 relative to the axis 4.

For the purposes of enhancing the image incident to reflection from the partial reflector 18 to the end that the image incident to reflection by this reflector is adequately discernible as compared with the image incident to reflection by the reflector 7, and of differentiating these images by imparting different colors respectively thereto, the reflection surface 19 of the reflector 18 is provided with a reflection controlling coating 31 of the interference type which has a selective reflection of different wavelengths of light. Such a coating may comprise a monolayer coating of suitable material, such as a metallic fluoride, of a suitable refractive index and thickness, but is preferably a multilayer coating, the layers of which are of different materials, such as different metallic fluorides, having suitable thicknesses and different indices of refraction. Such a multilayer coating is highly selective and more so than is a monolayer coating, and effects a relatively high degree of reflection of one wavelength greater than the normal reflection thereof by the reflector 18 and a relatively high degree of transmission of another wavelength.

It is preferable that the coating effect a high degree of reflection of the wavelength of yellow and a high degree of transmission of the wavelength of blue, thus increasing the brilliance of the image incident to reflection by the reflector 18. Where a multilayer coating is used and the coating effects a high degree of reflection of the wavelength of yellow and a high degree of transmission of the wavelength of blue, the reflection of the wavelength of yellow by the reflector 18 may be as high as fifty percent, while the transmission of the wavelength of blue may be as high as ninety percent.

The thickness of a monolayer coating and the thickness of the several layers of a multilayer coating are such as to attain maximum reflection of the wavelength selected for reflection by the reflector 18, the proper thickness of a monolayer coating being in terms of optical thickness an even multiple of a quarter of the selected wavelength and preferably one-half of the selected wavelength. Thus, the color contrast of the two images is attained by the coating 31, the reflector 7 preferably having substantially total reflection for all wavelengths.

The coating 31 may also comprise a gold or the like sputtering of the reflecting surface 19 which increases the reflection from the reflector 18 and decreases the transmission therethrough, thus tending to equalize the intensity of the images incident to reflection respectively by the reflectors 18 and 7.

While I have thus described my invention, I do not wish to be limited to the precise details described, as changes may be readily made without departing from the spirit of my invention, but having thus described my invention, I claim as new and desire to secure by Letters Patent the following:

1. In an optical imaging system for projecting a plurality of images from a single image source, the combination of an image source, a first reflector spaced from said image source along an axis along which light is received from said image source, a second reflector disposed between and spaced along said axis from said image source and first reflector, said second reflector being a partial reflector and said reflectors being similarly inclined across said axis and directed toward said image source to reflect two portions of light therefrom and the reflecting surface of one of said reflectors being spherical and positioned to reflect light from said image source in substantially the same direction as but on an axis laterally displaced from that of the light directed from said image source by the other of said reflectors, and an objective lens positioned to receive light reflected by said reflectors from said image source and produce two images of said image source, one from each of said reflectors, said spherical reflector accommodating for the different light path distances between said image source and said objective lense incident to reflection of said light portions respectively by said reflectors for effecting substantially equal sharpness of said two images.

2. In an optical imaging system for projecting a plurality of images from a single image source, the combination of an image source, a first reflector spaced from said image source along an axis along which light is received from said image source, a second reflector disposed between and spaced along said axis from said image source and first reflector, said second reflector being a partial reflector and said reflectors being similarly inclined across said axis and directed toward said image source to reflect two portions of light therefrom and said second reflector being a sphero concavo convex member having the convex face thereof directed toward said image source and positioned to reflect light from said image source in substantially the same direction as but on an axis laterally displaced from that of the light directed by said image source by said first reflector, and an objective lens positioned to receive light reflected by said reflectors from said image source and produced two images of said image source, one from each of said reflectors, said second reflector accommodating for the different light path distances between said image source and said objective lens incident to reflection of said light portions respectively by said reflectors for effecting substantially equal sharpness of said two images.

3. In an optical imaging system for projecting a plurality of images from a single image source, the combination of an image source, a first reflector spaced from said image source along an axis along which light is received from said image source, a second reflector disposed between and spaced along said axis from said image source and first reflector, said second reflector being a partial reflector and said reflectors being similarly inclined across said axis and directed toward said image source to reflect two portions of light therefrom and the reflecting surface of one of said reflectors being spherical and positioned to reflect light from said image source in substantially the same direction as but on an axis laterally displaced from that of the light directed from said image source by the other of said reflectors, a third reflector laterally spaced from the portion of said axis between said image source and said second reflector in the direction in which said light portions are reflected away from said axis by said first and second reflectors and inclined to said axis similarly to but to a lesser extent than the inclination of said first and second reflectors to said axis and directed toward said first and second reflectors to reflect said light portions across said axis, and an objective lens laterally spaced from said axis in the direction opposite said first mentioned direction and positioned to receive said light portions as reflected by said third reflector and produce two images of said image source, said spherical reflector accommodating for the different light path distances between said image source and said objective lens incident to reflection of said light portions by said first and second reflectors for effecting substantially equal sharpness of said two images.

4. In an optical imaging system for projecting a plurality of images from a single image source, the combination of an image source, a first reflector spaced from said image source along an axis along which light is received from said image source, a second reflector disposed between and spaced along said axis from said image source and first reflector, said second reflector being a partial reflector and said reflectors being similarly inclined across said axis and directed toward said image source to reflect two portions of light therefrom and said second reflector being a sphero concavo convex member having the convex face thereof directed toward said image source and positioned to reflect light from said image source in substantially the same direction as but on an axis laterally displaced from that of the light directed from said image source by said first reflector, a third reflector laterally spaced from the portion of said axis between said image source and said second reflector in the direction in which said light portions are reflected away from said axis by said first and second reflectors and inclined to said axis similarly to but to a lesser extent than the inclination of said first and second reflectors to said axis and directed toward said first and second reflectors to reflect said light portions across said axis, and an objective lens laterally spaced from said axis in the direction opposite said first mentioned direction and positioned to receive said light portions as reflected by said third reflector and produce two images of said image source, said second reflector accommodating for the different light path distances between said image source and said objective lens incident to reflection of said light portions respectively by said first and second reflectors for effecting substantially equal sharpness of said two images.

5. In an optical imaging system for projecting a plurality of images from a single image source, the combination as recited in claim 1 and further characterized in combination in that one of said reflectors is mounted for pivotal adjustment relative to the other of said reflectors to vary the lateral displacement of said images.

6. In an optical imaging system for projecting a plurality of images from a single image source, the combination as recited in claim 2 and further characterized in that said first reflector is mounted for pivotal adjustment relative to said second reflector on a second axis transverse to said first mentioned axis and substantially normal to the plane of inclination of said reflectors relative to said first mentioned axis to vary the lateral displacement of said images.

MALCOLM G. TOWNSLEY.

REFERENCES CITED

The following references are of record in the file of this patent:

UNITED STATES PATENTS

| Number | Name | Date |
|---|---|---|
| 1,709,809 | Rashevsky | Apr. 16, 1929 |
| 2,373,249 | Lurcott | Apr. 10, 1945 |
| 2,384,666 | Wood | Sept. 11, 1945 |
| 2,395,921 | Thurlow | Mar. 5, 1946 |

FOREIGN PATENTS

| Number | Country | Date |
|---|---|---|
| 837,661 | France | Nov. 18, 1938 |